US012762227B2

(12) United States Patent
Evans

(10) Patent No.: US 12,762,227 B2
(45) Date of Patent: Oct. 13, 2026

(54) MANAGEMENT OF RAISED SECURITY EVENTS AT A DATA PROCESSING SYSTEM

(71) Applicant: Fortinet, Inc., Sunnyvale, CA (US)

(72) Inventor: Simon James Winn Evans, London (GB)

(73) Assignee: FORTINET, INC., Sunnyvale, CA (US)

( * ) Notice: Subject to any disclaimer, the term of this patent is extended or adjusted under 35 U.S.C. 154(b) by 286 days.

(21) Appl. No.: 18/240,900

(22) Filed: Aug. 31, 2023

(65) Prior Publication Data

US 2025/0053647 A1 Feb. 13, 2025

(30) Foreign Application Priority Data

Aug. 10, 2023 (GB) ...................................... 2312267

(51) Int. Cl.
*G06F 21/55* (2013.01)
*G06F 21/54* (2013.01)

(52) U.S. Cl.
CPC ............ *G06F 21/554* (2013.01); *G06F 21/54* (2013.01); *G06F 21/552* (2013.01)

(58) Field of Classification Search
CPC ...... G06F 21/554; G06F 21/54; G06F 21/552; G06F 21/55; H04L 63/14
See application file for complete search history.

(56) References Cited

U.S. PATENT DOCUMENTS 9,336,385 B1 * 5/2016 Spencer .............. H04L 63/1441
9,853,941 B2 * 12/2017 Liang .................. H04L 63/0209
10,284,574 B1 * 5/2019 Aziz ......................... G06F 9/00
10,592,666 B2 * 3/2020 Kim ...................... G06F 21/552
10,673,880 B1 * 6/2020 Pratt ................... H04L 63/1425
11,323,459 B2 * 5/2022 Dichiu .................. G06F 21/554
(Continued)

FOREIGN PATENT DOCUMENTS

GB 2633000 A 3/2025
WO 2022087510 A1 4/2022
WO 2025032346 A1 2/2025

OTHER PUBLICATIONS

Dhurandher, Discloses Priority based Buffer Management Technique for Opportunistic Networks, IEEE (Year: 2019).*
(Continued)

*Primary Examiner* — Sangseok Park
(74) *Attorney, Agent, or Firm* — Jaffery Watson Hamilton & DeSanctis LLP

(57) ABSTRACT

Described herein is a data carrier storing program code for causing one or more processors of a data processing system to perform the following steps, the processor(s) having access to multiple criteria, each criterion being associated with an event having a reporting priority: establish a software entity at the data processing system configured to act as a local monitoring entity for the data processing system; monitor the data processing system using the local monitoring entity; raise an event based on the monitoring of the data processing system in dependence on one or more criteria; and in dependence on the event having been raised, assign a heightened reporting priority to one or more other events, the one or more other events being raised in dependence on one or more other criteria.

20 Claims, 3 Drawing Sheets

(56) References Cited

U.S. PATENT DOCUMENTS

| | | | | |
|---|---|---|---|---|
| 11,641,592 | B1 * | 5/2023 | Duraibabu | G10L 15/22 704/270.1 |
| 2005/0097569 | A1 * | 5/2005 | Chandrasekaran | H04L 41/0631 719/318 |
| 2007/0220604 | A1 * | 9/2007 | Long | G06F 21/55 726/22 |
| 2013/0055385 | A1 * | 2/2013 | Antony | G06F 21/577 726/22 |
| 2016/0306965 | A1 * | 10/2016 | Iyer | G06Q 10/0635 |
| 2020/0186569 | A1 | 6/2020 | Milazzo et al. | |
| 2020/0396230 | A1 * | 12/2020 | Liu | H04L 63/1416 |
| 2021/0250366 | A1 * | 8/2021 | Ladnai | G06N 5/04 |
| 2021/0258822 | A1 * | 8/2021 | Mukherjee | H04L 1/1864 |
| 2022/0053016 | A1 * | 2/2022 | Trost | H04L 63/1425 |
| 2022/0232025 | A1 * | 7/2022 | Kapoor | H04L 63/1425 |
| 2022/0294727 | A1 * | 9/2022 | Azzam | H04L 47/25 |
| 2022/0414217 | A1 | 12/2022 | Tock et al. | |
| 2023/0070650 | A1 * | 3/2023 | Bailey | G06F 21/6218 |
| 2023/0075355 | A1 * | 3/2023 | Twigg | H04L 67/306 |
| 2024/0061937 | A1 * | 2/2024 | Camp | G06F 21/566 |
| 2024/0080344 | A1 * | 3/2024 | Francesco | H04L 63/1433 |
| 2024/0106838 | A1 * | 3/2024 | Gasiorek | H04L 63/1416 |

OTHER PUBLICATIONS

Search Report for UK Application No. GB2312267.4, Jul. 12, 2024, 1 page.

International Preliminary Report on Patentability and Written Opinion for PCT/GB2024/052112 mailed Feb. 19, 2026, 8 pages.

* cited by examiner

MANAGEMENT OF RAISED SECURITY EVENTS AT A DATA PROCESSING SYSTEM

CROSS-REFERENCES TO RELATED APPLICATIONS

The present application claims the benefit of GB Application No. 2312267.4, filed on Aug. 10, 2023, the entire disclosure of which is hereby incorporated herein by reference in its entirety for all purposes.

FIELD OF THE INVENTION

This invention relates to endpoint security, in particular to the management, of security events raised at a data processing system.

BACKGROUND OF THE INVENTION

Organizations implementing networks of computing devices may have cyber security solutions in place, including firewalls, network security appliances and antivirus solutions. However, such measures cannot necessarily manage insider risks. Intentional, or unintentional but damaging, actions by users of computing devices in a network can be a serious vulnerability to organizations that traditional tools may not be able to defend against.

Common identity management (CIM) tools cannot necessarily prevent a malicious insider with credentials from performing damaging actions, as they lack certain context. For example, sensitive data can be hosted on servers with access control rules, but they cannot quantify how it is affected by users' poor cyber hygiene practices. They also cannot track the effectiveness of their security controls and training.

Rules defined in security policies that are implemented by entities in a network can be an efficient way to detect real-world insider risk scenarios. For example, policies may be defined so as to permit the detection of users who use restricted administrative tools, send sensitive information outside of the organization, circumvent security restrictions or suspiciously print documents during unusual hours.

When such activities by users are detected at a local device, a security event can be raised which can be reported from the local device to a remote monitoring entity. However, such events can only be reported to a remote monitoring entity when there is sufficient connectivity between the local and remote devices and there may be limited capacity for storing the events at the local device after generation.

It is desirable to manage such events after generation such that, for example, they can be reported to a remote monitoring entity to highlight undesirable activity by one or more users of the local device.

BRIEF SUMMARY OF THE INVENTION

According to one aspect, there is provided a data carrier storing program code for causing one or more processors of a data processing system to perform the following steps, the processor(s) having access to multiple criteria, each criterion being associated with an event having a reporting priority: establish a software entity at the data processing system configured to act as a local monitoring entity for the data processing system; monitor the data processing system using the local monitoring entity; raise an event based on the monitoring of the data processing system in dependence on one or more criteria; an in dependence on the event having been raised, assign a heightened reporting priority to one or more other events, the one or more other events being raised in dependence on one or more other criteria.

The monitoring of the data processing system may comprise monitoring an operating system kernel of the data processing system. The monitoring of the data processing system may comprise monitoring one or more applications (for example, user space applications, such as web browsers and email clients) running on the data processing system. This may allow events generated as a result of activity on such applications to be raised. The monitoring of the data processing system may comprise monitoring connections of the data processing system to other entities or networks. The monitoring of the data processing system may comprise monitoring data sent or received via such connections. This may allow events to be raised as a result of activity relating to such connections or data transfers to be raised. The monitoring of the data processing system may comprise monitoring files stored at the data processing system. This may allow events to be raised when, for example, files are renamed and/or transferred between folders.

The program code may cause the one or more processors to report to a remote monitoring entity the occurrence of events in dependence on their respective reporting priorities.

The program code may cause events to be stored in a buffer at the data processing system in dependence on their respective reporting priorities.

The events may be stored in the buffer until there is sufficient connectivity between the data processing system and the remote monitoring entity to report the occurrence of the events to the remote monitoring entity.

The one or more other events raised in dependence on the one or more other criteria may be one or more events raised previously and/or subsequently to the event.

The one or more other events may be related or dependent events to the event.

The one or more other events may comprise a previously raised event involved in triggering the raising of the event. For example, the one or more other events may have been raised based on one or more actions at the data processing system involving the same file as the one or more actions that caused the event to be raised.

The raised event may be a result of activity of a user of the data processing system. The one or more other events may be other events associated with that user's activity at the data processing system.

The program code may cause the one or more processors to learn which other events are to be assigned a heightened reporting priority when a respective event is raised.

The data processing system may be configured to store a directed acyclic graph of events. The one or more processors may be configured to determine which events to assign a heightened reporting priority to in dependence on the graph.

The one or more processors may be configured to train a model (such as a graph neural network) over the graph to determine which other events to assign a heightened reporting priority to.

The local monitoring entity may be configured to present raised events in an interface viewable by a system administrator, wherein the events are presented in dependence on their respective reporting priorities (which may include heightened reporting priorities, where assigned).

According to another aspect, there is provided a data carrier storing program code for causing one or more processors of a data processing system to perform the following steps, the processor(s) having access to multiple criteria, each criterion being associated with an event having a reporting priority: establish a software entity at the data processing system configured to act as a local monitoring entity for the data processing system; monitor the data processing system using the local monitoring entity; raise an event based on the monitoring of the data processing system in dependence on one or more criteria; assign a reporting priority to the event in dependence on the criteria; and report to a remote monitoring entity the occurrence of events in dependence on their respective reporting priorities.

The program code may cause events to be stored in a buffer at the data processing system in dependence on their respective reporting priorities. An event may be assigned a heightened reporting priority in dependence on another event being raised, as described above. Events may be stored at the buffer in dependence on their heightened reporting priorities, if a respective event has been assigned a heightened reporting priority. Events which have not been assigned a heightened reporting priority may be stored at the buffer in dependence on their originally assigned reporting priorities.

The events may be stored in the buffer until there is sufficient connectivity between the data processing system and the remote monitoring entity to report the occurrence of the events to the remote monitoring entity.

The events may be stored in the buffer in a queue. Each event may be assigned a respective position in the queue in dependence on its respective reporting priority.

The buffer may have a fixed capacity. The program code may cause events with a higher reporting priority to be stored at the buffer to replace events with a lower reporting priority stored at the buffer.

The buffer may have a variable capacity. The program code may cause the buffer to increase its capacity to accommodate an event with a higher reporting priority than one or more other events stored at the buffer.

The program code may cause the one or more processors to, if the buffer has greater than a predetermined occupancy, coalesce one or more events stored at the buffer having a reporting priority below a threshold.

The program code may cause the one or more processors to direct raised events to one of multiple egress queues in dependence on their respective reporting priorities.

The multiple criteria may be associated with or defined in one or more security policies. The criteria (for example, the security policies) may each comprise a specification of one or more actions on the data processing system. The criteria may each comprise a specification of one or more actions on the data processing system that the local monitoring entity is to report to the remote monitoring entity.

According to a further aspect, there is provided a method for implementation by one or more processors of a data processing system, the processor(s) having access to multiple criteria, each criterion being associated with an event having a reporting priority, the method comprising: establishing a software entity at the data processing system configured to act as a local monitoring entity for the data processing system; monitoring the data processing system using the local monitoring entity; raising an event based on the monitoring of the data processing system in dependence on one or more criteria; and in dependence on the event having been raised, assigning a heightened reporting priority to one or more other events, the one or more other events being raised in dependence on one or more other criteria.

According to a further aspect, there is provided a method for implementation by one or more processors of a data processing system, the processor(s) having access to multiple criteria, each criterion being associated with an event having a reporting priority, the method comprising: establishing a software entity at the data processing system configured to act as a local monitoring entity for the data processing system; monitoring the data processing system using the local monitoring entity; raising an event based on the monitoring of the data processing system in dependence on one or more criteria; assigning a reporting priority to the event in dependence on the criteria; and reporting to a remote monitoring entity the occurrence of events in dependence on their respective reporting priorities.

According to another aspect, there is provided a computer program which, when executed by a computing device, causes the computing device to perform the method described above.

According to a further aspect, there is provided an apparatus comprising one or more processors configured to perform the steps described above.

According to a further aspect, there is provided a data carrier storing in non-transient form the computer program described above.

BRIEF DESCRIPTION OF THE DRAWINGS

The present invention will now be described by way of example with reference to the accompanying drawings.

In the drawings.

DETAILED DESCRIPTION OF THE INVENTION

Figure 1:
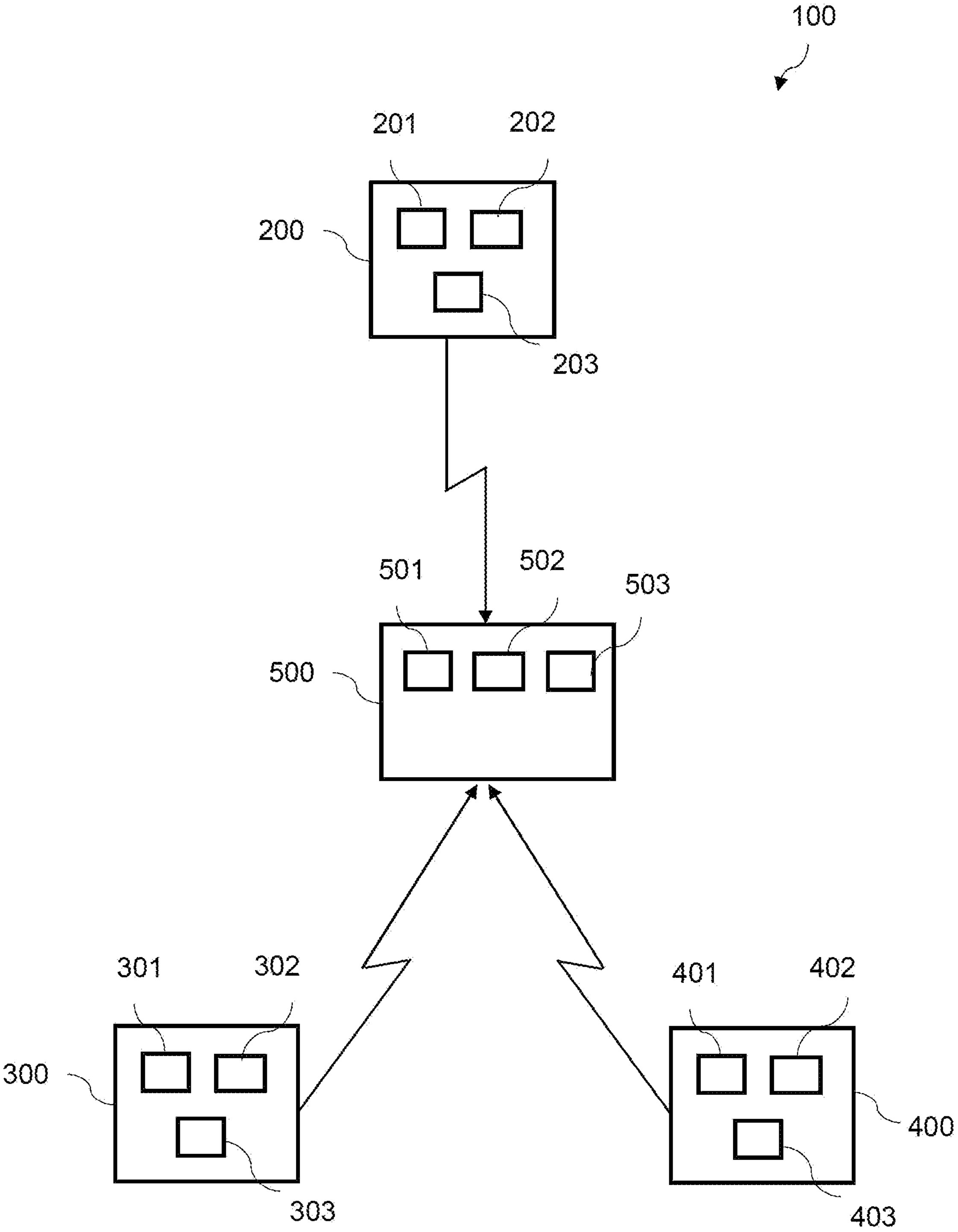
FIG. 1 schematically illustrates a network of computing devices.

FIG. 1 schematically illustrates a network 100 comprising multiple data processing systems. In this example, the data processing systems are computing devices 200, 300, 400. Each computing device may be, for example, a desktop computer, laptop computer, tablet, mobile phone and/or server computer or a combination thereof. Other suitable computing devices may also be implemented in such a network. The devices may be connected in the network by wired and/or wireless connections. The network may, for example, be a corporate network. Access to the network may be restricted, for example by security devices that filter traffic at the boundary of the network. The network may interface via such security devices to a publicly accessible network such as the internet.

Computing devices 200, 300, 400 each comprise a processor 201, 301, 401 and a memory 202, 302, 402. The processor 201, 301, 401 may be implemented as dedicated hardware. Alternatively, the processor 201, 301 401 may be implemented as a computer program running on a programmable device such as a central processing unit (CPU). The respective memory 202, 302, 402 is arranged to communicate with the respective processor 201, 301, 401. Memory 202, 302, 402 may be a non-volatile memory. Each device 200, 300, 400 may comprise more than one processor and more than one memory. The memory may store data (i.e., the memory is a data carrier) that is executable by the processor. By executing program code contained in such data, the one or more processors may perform functions as described herein. The memory may store such program code in a non-transitory manner. The processor may be configured to operate in accordance with a computer program stored in non-transitory form on a machine readable storage medium. The computer program may store instructions for causing the processor to perform its methods in the manner described herein.

Each computing device 200, 300, 400 can support a local software entity or agent. The software entity is able to collect information relating to the computing device and/or a user thereof. There may be one or more users authenticated to the computing device 200. The computing device supports the agent by storing and executing program code which, when executed, implements the agent. In this example the agent is a software entity. The agent may be implemented by one or more principal processors of the computing device, which processor(s) also implement functions of the computing device that implement the computing device's core functions. For example, if the computing device is a desktop computer, its core functions may include sending and receiving email and performing word processing tasks. Thus the principal processors may divide their time between implementing the agent and implementing other functions. Alternatively a dedicated processor may implement the agent.

The agent may be implemented as a user space application program. As used herein, user space applications are applications running in the user space, which is the memory area and a hardware privilege level of a data processing system where, for example, application software and some drivers may execute. The user space may be a limited part of the total memory of the data processing system (e.g., computing device). A user space application may have a corresponding user interface (UI) whereby a user can interact with the application. For example, the user may provide input to the application via the UI. In contrast to user space, kernel space (or supervisor mode) is memory area and hardware privilege level of the data processing system reserved for running an operating system kernel.

In addition to implementing the agent, the computing device may also implement other user space applications. The computing device may implement one or more user space applications that are not the agent.

Each device 200, 300, 400 may also comprise a transceiver 203, 303, 403 which allows the respective device to communicate with a remote monitoring entity at the central infrastructure apparatus 500.

Central infrastructure apparatus 500 also comprises a processor 501, a memory 502 and a transceiver 503. Processor 501 and memory 502 may operate as described above with reference to processor 201 and memory 202. The apparatus 500 may comprise more than one processor and more than one memory. Transceiver 503 may send or receive data to or from the transceivers 203, 303, 403 of any of the computing devices 200, 300, 400 in the network. The apparatus 500 may be communicatively coupled to a user interface which can, for example, allow a user of the apparatus 500 to specify particular settings relating to the security of files.

Each computing device 200, 300, 400 may receive information, such as security policies, from the apparatus 500. Each computing device 200, 300, 400 may also receive updates to the software entity that implements the agent from the central infrastructure apparatus 500. Each computing device 200, 300, 400 may also send information to the apparatus 500.

The computing devices 200, 300, 400 may implement different operating systems. For example, each computing device may implement one of the macOS, Windows or Linux operating systems.

Taking computing device 200 as example, computing device 200 implements a software entity in the form of an agent which monitors the computing device. The computing device 200 may implement a version of the agent suitable for the operating system running on the device 200.

The agent, which acts as the local monitoring entity, monitors the device. The agent may monitor the operating system kernel on the device, or monitor applications running on the device, such as web browsers and email clients.

The processor of the computing device 200 has access to multiple criteria. The criteria may be stored at a memory of the device. The criteria may be received from another device, such as the central infrastructure apparatus 500. Updates to these criteria may be made as appropriate. The criteria may specify one or more actions. If the one or more actions are detected by the agent to have occurred at the device, the agent can raise an event. The criteria may be stored at the device. The criteria may be predefined criteria. For example, an event may be raised when a user performs an action for the first time, and/or performs an action outside of normal working hours. In some examples, the criteria may define an event. In other implementations, the criteria may be defined by parameters of a model, such as a machine learning or statistical model. The agent may raise an event when the output of the model, based on input to the model associated with activity at the device 200, indicates that an event should be raised. The model may be received from the central infrastructure apparatus 500. The model may be stored at the memory 202 of the device 200 and be accessible by the processor 201. The processor 201 may execute the model.

The one or more criteria may be defined in one or more security policies. The policies may be received by the agent implemented at the computing device from the central infrastructure apparatus. The local monitoring agent is configured to determine whether to raise an event in dependence on the one or more security policies. Security policies are configurable rules that can be used to raise sensors/alerts based on activity detected by the local monitoring entity (agent). The security policies preferably comprise a specification of actions on a computing device supporting a local monitoring entity that that local monitoring entity should report to a remote monitoring entity. Policies may specify actions such as the use of restricted administrative tools, sending sensitive information outside of the organization, circumventing security, accessing files, downloading data onto a USB device, and printing documents during irregular hours. Events may therefore be detected based on security policies comprising a specification of actions on the data processing system that the local monitoring entity is to report to a remote monitoring entity. Policies may also specify one or more particular attributes of a file, for example, file content or a part thereof, properties or characteristics of the file (such as file type, file name etc), or metadata associated with the file.

If one or more of the actions defined in one or more of the criteria (for example, defined in one or more security policies) are detected as having occurred, the local monitoring entity can raise an event. Raised events can be reported to a remote monitoring entity. The remote monitoring entity may be implemented at the central infrastructure 500. The raising of the event indicates that the violation of a security policy has occurred. In response, the remote monitoring entity may raise an alert and/or log the violation, optionally along with the user identifier of the user that violated the policy. In response to an event being raised, the device 200 or the infrastructure 500 may generate a visible and/or audible alert, and/or may store data relating to the policy violation. This stored data can be accessed by a user, such as an administrator.

As mentioned above, once events have been raised, they can be reported to the remote monitoring entity. This is generally performed by sending the events from the local device to the remote monitoring entity via a network, such as the internet. However, generally, the computing device 200 may only report events to the central infrastructure 500 if there is a connection between the device 200 and the infrastructure 500. The connection may be a pre-existing connection. If there is no connection between the device 200 and the infrastructure 500 at the time that the event is raised, the event can be stored at the device until a connection between the local monitoring entity and the remote monitoring entity is established or resumed.

The events may be stored at the device 200 in a buffer. The buffer may be part of memory 202. The buffer may be in the form of a spooler. Events may be stored in the buffer in a queue. The order of events in the queue may be typically determined by the time of generation of the events (i.e. the time that they were raised), with older events having a higher position in the queue (meaning that they will be reported to the remote monitoring entity sooner when there is sufficient connectivity). However, if the buffer has a fixed capacity, and the rate of event generation exceeds the rate of event buffer egress, this can result in important events not being reported to the remote monitoring entity.

Given a finite amount of available network bandwidth and local storage for buffering (which may also be additionally constrained by operator configured limits), it is desirable to make decisions regarding how and when to buffer events when the event generation rate exceeds the event buffer egress rate, and/or how and when to drop or backpressure upstream event generation.

Many such systems tail drop (that is, allow buffers to fill and then drop subsequent events). However, this may provide an easy way for an adversary to hide suspicious events by simply generating sufficient noise to fill the buffer and then perform the undesirable activity, for which all events will be dropped as long as the buffers remain full and dominated by noise.

It may in some situations be desirable to prioritize certain events for reporting to the remote monitoring entity.

This can be achieved by assigning a reporting priority to each respective event. The reporting priorities serve as importance weights or metrics for the respective raised events. There may be a reporting priority associated with each criterion that results in an event being raised when actions are performed at the data processing system that are specified in the criterion. That event can be assigned the reporting priority associated with the criterion. Therefore, when an event is raised by the agent due to a criterion being satisfied, the reporting priority associated with that criterion can be assigned to the raised event. For example, when events are raised due to a violation of that security policy, the reporting priority associated with that policy can be assigned to the raised event.

For example, the event may be assigned a reporting priority that takes into account whether the binary is unsigned, and/or part of the operating system, etc. File events may be weighted according to access modes and source. For example, file writes can be weighted more heavily than file reads, and so events corresponding to file writes may be assigned a higher reporting priority than events corresponding to file reads. The system may down-weight events corresponding to reads corresponding to binaries being loaded or files associated with system updates, and up-weight files that are associated with user activity (such as a File→Save as operation from a spreadsheet application).

The raising of certain events may cause the importance of other events to be heightened compared to the standard associated importance of such events (i.e. compared to the standard reporting priorities of such events that are associated with the criteria that caused the events to be raised). Importance metrics assigned to one raised event can be propagated to related or dependent events. This may allow events that, on their own, do not appear to be particularly important (and therefore have relatively low standard reporting priorities) to be monitored more closely (by assigning them a heightened reporting priority compared to their respective standard reporting priorities) when raised in conjunction with other related or dependent events.

Therefore, when a particular event is raised in dependence on one or more of the criteria, a heightened reporting priority may be assigned to one or more other events raised in dependence on one or more other criteria (i.e., when the actions specified in the one or more other criteria are satisfied). The one or more other events may be raised previously or subsequently to the raised event. For example, one or more events raised previously which, on their own, were not considered to be particularly important can be assigned a heightened reporting priority once a later event has been raised that is related to the previously raised event(s). The system can determine whether one or more events related to the presently detected event have been previously detected and then propagate the weighting to those one or more events, such that those one or more events are assigned a heightened reporting priority. The system may therefore back propagate weights from a current event to previously raised events that have been involved in triggering the current raised event.

For example, if an event is raised due to one or more actions at a data processing system, for example comprising a file being uploaded to a remote file server using a remote transfer tool such as Secure File Transfer Protocol (SFTP), a heightened reporting priority may be assigned to related previously raised events, such as the file being downloaded from a website (with a browser) and/or the file(s) being compressed by an archiving tool such as Zip. The previously raised related event(s) may therefore be events involving the same file.

In another example, a sequence of events may be raised as a result of activity at the data processing system as follows: an email is received containing a link; the link is clicked and visited with a web browser; a file is downloaded and then executed; a phishing attack is detected.

The raising of the final event (the detection of a phishing attack) may be used to increase the weight of the related preceding events involved in the activity triggering the raising of the later event by assigning a heightened reporting priority to them. On their own, such previously raised events might have lower importance and hence a lower reporting priority. In combination with the final event, these events can be assigned a higher reporting priority compared to the standard reporting priority associated with their criteria.

Another exemplary sequence of related actions resulting in raised events may be as follows: a file is created using Excel by a user in the finance department; the file is renamed to look like an image file (by changing the file extension to .jpg); the file is copied to a USB stick. As a result of the final event being raised, heightened reporting priorities can be assigned to the earlier related events involving the file.

For source code, the following sequence of events may occur as a result of actions of a data exfiltration technique: a company source code repository is cloned using a source code management tool such as git; the target repository is changed to a personal account; the repository is pushed to the personal account. A similar sequence may occur using file sharing systems such as Dropbox (i.e. a file is downloaded from company account and then uploaded to a personal account), or in conjunction with other techniques (for example, a file is cloned with git, compressed using zip, and uploaded to a personal file sharing account). In such sequences of events, when a later event is raised, heightened reporting priorities can be assigned to the earlier related events to increase the importance of these events, which alone may have been considered relatively unimportant.

The assigned reporting priorities may be used to manage raised events in several ways. For example, they may be used to rank events in a user interface (UI) at the computing device or the infrastructure, or they may be used for filtering and prioritisation of events sent to central data store. They may also be used in determining a length of time for which respective events are kept on the agent (for example, in order to allow them to influence future decisions without a round-trip to the remote monitoring entity).

The weightings may also be used to prioritise and/or order the events that are stored at the local device and then sent over a network from the agent to the remote monitoring entity, for example at the infrastructure 500. This may help to minimise the probability that an important event is dropped rather than buffered when network conditions are such that the event egress rate is lower than the event generation rate.

As mentioned above, the events may be stored in a buffer at the local device 200. The events may be stored in a queue. The assigned reporting priority or weighting may be used in the management of the queue of events in the buffer at the computing device. This may allow the queue occupancy and order to be managed in dependence on the respective priorities of the raised events.

Each event may be assigned a respective position in the queue in dependence on its respective reporting priority. Therefore, events with a higher reporting priority may be assigned a queue position closer to the front of the queue than other events having lower reporting priorities. This can allow events with higher reporting priorities to be reported to the remote monitoring entity preferentially compared to events with lower reporting priorities.

The assigned reporting priority for each event may alternatively or additionally determine the length of time that a respective event is kept in the buffer of the local monitoring device.

In some examples, the buffer may have a fixed capacity. Generated events with a higher reporting priority may replace events with a lower reporting priority stored at the buffer. Events which are replaced can be dropped from the buffer.

In other examples, the buffer may have a variable capacity. The buffer may increase its capacity to accommodate an event with a higher reporting priority than one or more other events stored at the buffer.

The reporting priorities of the events currently stored in the buffer may determine whether events are dropped from the buffer or, alternatively, whether the capacity of the buffer is to be increased to accommodate a newly generated event. For example, if, at the time of generation of an event, all of the events currently stored in the buffer have reporting priorities that exceed a predetermined threshold, the capacity of the buffer may be increased to accommodate the generated event, instead of dropping an existing event from the buffer. In another example, if one or more events currently stored in the buffer have a reporting priority that is below a predetermined threshold, one of those events may be dropped to accommodate the generated event.

The assigned reporting priorities may be used to dynamically manage compaction targets and thresholds. In some implementations, if the buffer has greater than a predetermined occupancy, one or more events stored at the buffer having a reporting priority below a threshold may be coalesced so that they occupy less memory in the buffer. This may allow space to be provided in the buffer for other, more important events.

For example, for events raised as a result of file access, aggregates can be used if many files are accessed within a given directory. Lower importance events can be coalesced (either by weight or class, for example file read vs write vs delete) and higher importance events and their corresponding information can be kept in full.

Backpressure (for example, using a measure of the egress queue fullness) can be used to trigger more aggressive compaction of file events. Rather than reporting events corresponding to individual files accessed by a process, these can be aggregated to a single event such as "process accessed 100 files in a given folder". The compaction can be applied to subsets of the file events. For example, read-only file accesses may be compacted, but the full file details may be provided for file modifications or deletes. Backpressure from the egress queue(s) can be used as part of the feedback loop in the compaction control system, which can then target an egress event rate which will not overflow the queues or cause excessive dropping of existing queued events. The same approach can be applied to network events by applying aggregations to destination network locations, rather than reporting the individual connection events. Therefore, multiple raised events can be coalesced or compacted in dependence on the occupancy of the queue. The events to be coalesced or compacted may be determined in dependence on the reporting priorities of the events.

Raised events may also be directed to one of multiple egress queues at the buffer in dependence on their respective reporting priorities. The queue may be physical or virtual queue. Certain events (e.g. detections) may be steered into high priority queue. This may be done either explicitly for example by having a separate event-specific queue, or implicitly, for example by managing the weights and queue assignment by weight appropriately (for example in a class of service approach). The events in each respective queue may be associated with a process. In some examples, the generated order of the events may be maintained in each of the queues. Each queue may be associated with a particular range or class of reporting priorities.

Stochastic congestion control or queue length algorithms may be used, such as weighted random early detection (WRED) to manage maximum queue occupancy and allow space for the events associated with, for example, a particular user's activity. The event weight can be fed into the algorithm so that noise is statistically more likely to be dropped from the buffer than interesting events (for example, file write events initiated by the user).

For example, a detected event may be a result of activity by a particular user at the computing device. The weighting may then be propagated to other events associated with that user's activity to assign those events with a heightened reporting priority. One or more of the multiple criteria may define certain actions by this user as being actions that should raise an event and be reported to the monitoring entity. In dependence on this event being raised, other events raised by activity of the same user may be assigned a heightened reporting priority. This may assist in highlighting activity at the data processing system by particular users, such as those who are leaving the organization or who are at risk of redundancy.

The heightening of the reporting priority of existing related events may result in these higher priority events being held longer in the buffer (before being sent to the remote monitoring agent) or in the agent's event graph at the remote monitoring entity.

The device may output an explicit congestion notification (ECN) prior to events being dropped from the buffer. An ECN can be generated to provide a notification to upstream event sources (such as a file event compaction system) that the queue is becoming full and events are soon likely to be dropped. Alternatively, a notification that an event has been dropped can be output. This can be used as a notification to the upstream systems that the queue is full. Events can therefore be compacted or coalesced in response to a notification that the occupancy of the queue is above a threshold.

Events can also be modulated by multiplying incoming weights (optionally with a clamp). In one example, a file even may have a standard report priority of, for example, 0.75. If preceded by an event indicating privilege escalation (with a tool such as Psexec, which allows a user to elevate a process under their control to that of the SYSTEM process), which may have an assigned weight of, for example, 10.0, then all subsequent events raised as a result of that user's process can have their weights (i.e. reporting priorities) multiplied by 10.0. In some implementations, the control of queue priority/congestion management may generally work with weights in the range 0-1.0, so the resulting weight of 7.5 can be clamped to 1.0 for queue management purposes. The raw value (7.5) may also be passed to the reporting system when used as an importance value (i.e., a reporting priority).

The reporting priorities that are associated with each of the criteria may optionally be learned. The one or more other events (raised in dependence on one or more other criteria) that are assigned a heightened reporting priority to when a particular event is raised may alternatively or additionally be learned. The one or more processors of the device may be configured to train a model to learn the reporting priorities to apply to different events, and which related events to propagate these to. The trained model may then be used to infer which events are to be assigned a heightened reporting priority when a particular event is raised.

In some examples, the device may learn events to be weighted more highly over time by keeping a data structure, such as a database or graph, of raised events and looking for commonality across nodes. The data structure of events may be stored at memory 202 of the computing device 200. A model may be trained over the stored data to learn the reporting priorities to assign to different events. For example, the model (such as a graph neural network) may be trained over a graph labelled by events to determine how to modulate the weights of previously and/or subsequently raised events. This may help the system to identify that if an event happens everywhere and is triggered by, for example, an operating system vendor signed application, it is likely to be an unimportant event and need not be assigned a high reporting priority.

In one example, a memory of the device 200 may store a directed acyclic graph of previously raised events. When an event is raised due to file activity by a particular user, and the file activity causing that event to be raised corresponds to a criterion being satisfied that is associated with a high reporting priority (for example, a reporting priority above a predetermined threshold), weights may be propagated forward to subsequent events to boost the reporting priorities of events raised due to file activity associated with the same system user. Therefore, the system may transitively propagate importance weights forward from, for example, events raised as result of activity by a particular user (such as privilege escalation via process exec of PsExec) to subsequent file events in order to boost the reporting priority of events corresponding to file activity associated with that system user.

In one example, if a currently raised event is configured such as {files}→(zip)→(encrypt)→(upload), the {files} and (zip) node weights may be boosted (i.e. events corresponding to these actions may be assigned heightened reporting priorities), as they are potential matches for the main pattern.

A declarative event detection system may be used (for example, one that looks for patterns within a directed acyclic graph via incremental subgraph matching). In this case, candidate subgraphs may be boosted so that events corresponding to those subgraphs are assigned a heightened reporting priority. As a result, such events may be more likely to be held in the buffer, and subsequently reported to the remote monitoring entity, and/or held within the agent's event graph under max vertex/edge constraints.

Figure 2:
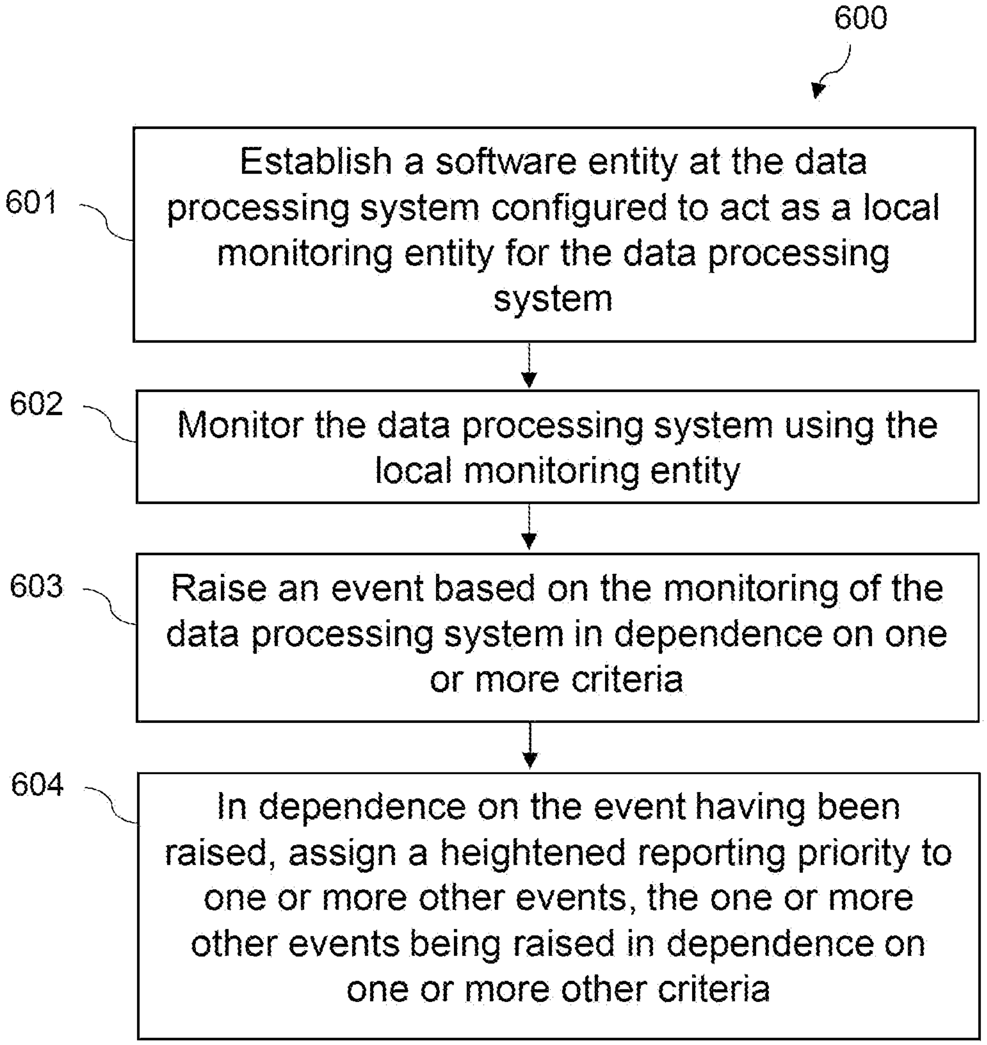
FIG. 2 shows an example of a method for implementation at a data processing system.

FIG. 2 shows the steps of an exemplary a method 600 for implementation by one or more processors of a data processing system, the processor(s) having access to multiple stored criteria, each criterion being associated with an event having a reporting priority. At step 601, the method comprises establishing a software entity at the data processing system configured to act as a local monitoring entity for the data processing system. At step 602, the method comprises monitoring the data processing system using the local monitoring entity. At step 603, the method comprises raising an event based on the monitoring of the data processing system in dependence on one or more criteria. At step 604, the method comprises, in dependence on the event having been raised, assigning a heightened reporting priority to one or more other events, the one or more other events being raised in dependence on one or more other criteria.

Figure 3:
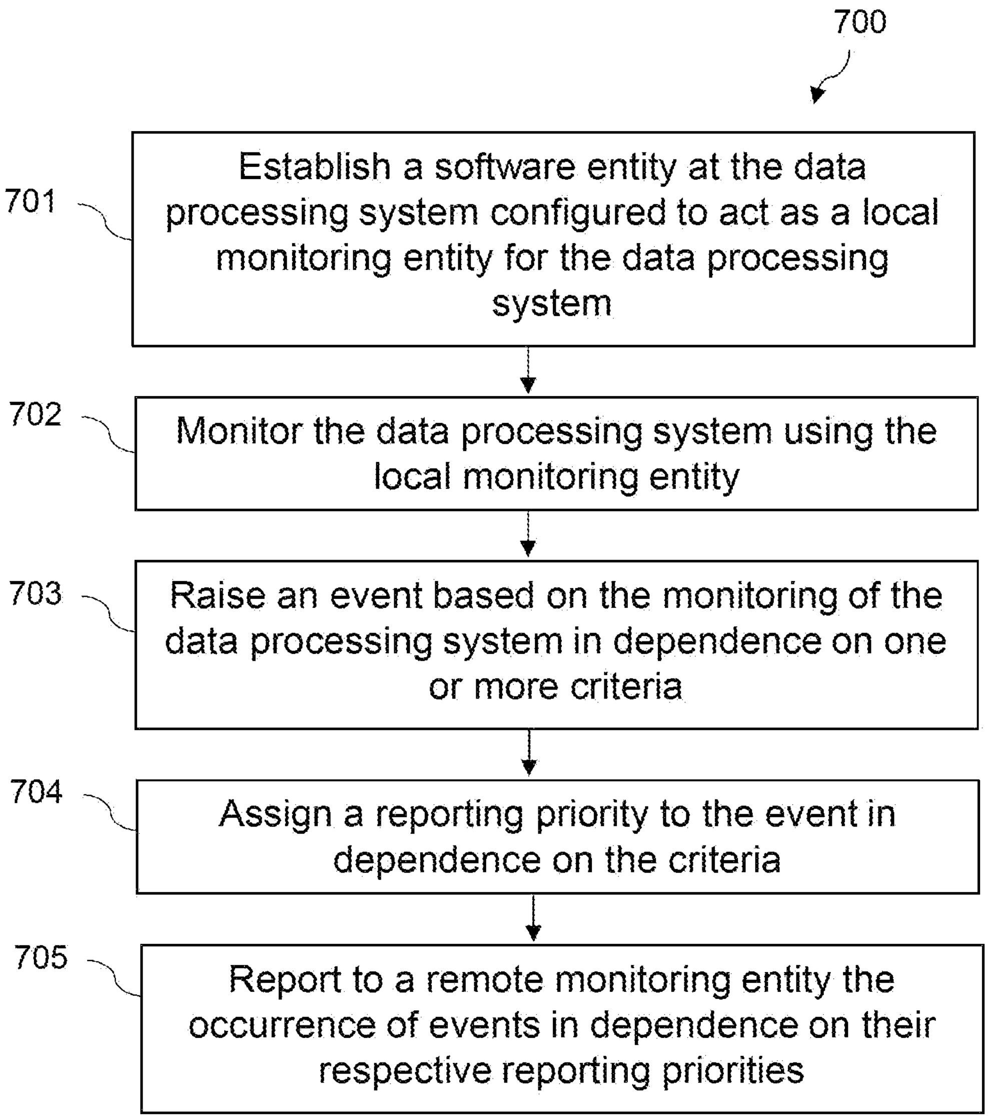
FIG. 3 shows an example of a further method for implementation at a data processing system.

FIG. 3 shows the steps of an exemplary method 700 for implementation by one or more processors of a data processing system, the processor(s) having access to multiple stored criteria, each criterion being associated with an event having a reporting priority. At step 701, the method comprises establishing a software entity at the data processing system configured to act as a local monitoring entity for the data processing system. At step 702, the method comprises monitoring the data processing system using the local monitoring entity. At step 703, the method comprises raising an event based on the monitoring of the data processing system in dependence on one or more criteria. At step 704, the method comprises assigning a reporting priority to the event in dependence on the criteria. At step 705, the method comprises reporting to a remote monitoring entity the occurrence of events in dependence on their respective reporting priorities.

The approach described herein may assist in preventing malicious activities from occurring by alerting on suspicious behaviour and in response, the local computing devices may block activities such as the uploading of confidential files to personal drives. This may improve cyber hygiene and keep data and endpoints secure, regardless of location (for example, whether the user is in the office or working remotely) and network connection (for example, public WiFi or VPN). This may provide improved endpoint security, as well as visibility into user behaviour, data access, and system use.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A non-transitory machine-readable medium storing program code, which when executed by one or more processors of a data processing system, cause the data processing system to:

establish a software entity at the data processing system configured to act as a local monitoring entity for the data processing system;

monitor the data processing system for insider risk scenarios based on a plurality of security policies using the local monitoring entity;

raise an event, by the local monitoring entity, based on the monitoring of the data processing system in dependence on one or more criteria specified by a security policy of the plurality of security policies, wherein raising of the event is indicative of a violation of the security policy, wherein each of the plurality of security policies has a reporting priority, and wherein events raised by the local monitoring entity have a reporting priority;

assign, by the local monitoring entity, the reporting priority of the security policy to the reporting priority of the event; and in dependence on the event having been raised, assign, by the local monitoring entity, a heightened reporting priority to one or more other events, the one or more other events being raised, by the local monitoring entity, in dependence on one or more other criteria of one or more other security policies of the plurality of security policies, wherein raising of the one or more other events are indicative of one or more violations of the one or more other security policies, and wherein the heightened reporting priority represents recognition, based on context provided by the event, of an increased importance of the one or more other events as compared to an importance represented by the reporting priority of respective security policies of the one or more other security policies.

2. The non-transitory machine-readable medium as claimed in claim 1, wherein the program code is configured to cause the one or more processors to report, by the local monitoring entity, to a remote monitoring entity occurrence of events in dependence on their respective reporting priorities.

3. The non-transitory machine-readable medium as claimed in claim 2, wherein the program code causes events to be stored, by the local monitoring entity, in a buffer at the data processing system in dependence on their respective reporting priorities.

4. The non-transitory machine-readable medium as claimed in claim 3, wherein the events are stored in the buffer until there is sufficient connectivity between the data processing system and the remote monitoring entity to report, by the local monitoring entity, the occurrence of the events to the remote monitoring entity.

5. The non-transitory machine-readable medium as claimed in claim 1, wherein the one or more other events raised in dependence on the one or more other criteria are one or more events raised previously to the event, and wherein the heightened reporting priority is assigned retroactively to the one or more events raised previously.

6. The non-transitory machine-readable medium as claimed in claim 1, wherein the one or more other events are related or dependent events to the event.

7. The non-transitory machine-readable medium as claimed in claim 1, wherein the raised event is a result of activity of a user and wherein the one or more other events are other events associated with that user's activity.

8. The non-transitory machine-readable medium as claimed in claim 1, wherein the program code causes the one or more processors to learn which other events are to be assigned a heightened reporting priority when a respective event is raised.

9. The non-transitory machine-readable medium as claimed in claim 1, wherein the data processing system is configured to store a directed acyclic graph of events raised by the local monitoring entity that are indicative of violations of respective security policies of the plurality of security policies and wherein the one or more processors are configured to determine which of the events to assign a heightened reporting priority to in dependence on the directed acyclic graph.

10. The non-transitory machine-readable medium as claimed in claim 1, wherein the local monitoring entity is configured to present raised events in an interface viewable by a system administrator, wherein the events are presented in dependence on their respective reporting priorities.

11. A non-transitory machine-readable medium storing program code, which when executed by one or more processors of a data processing system, cause the data processing system to:

establish a software entity at the data processing system configured to act as a local monitoring entity for the data processing system;

monitor the data processing system for insider risk scenarios based on a plurality of security policies using the local monitoring entity;

raise an event, by the local monitoring entity, based on the monitoring of the data processing system in dependence on one or more criteria specified by a security policy of the plurality of security policies, wherein raising of the event is indicative of a violation of the security policy, wherein each of the plurality of security policies has a reporting priority, and wherein events raised by the local monitoring entity have a reporting priority;

assign, by the local monitoring entity, a reporting priority to the event in dependence on the reporting priority associated with the security policy;

based on the event having been raised, assign, by the local monitoring entity, a heightened reporting priority to one or more other events, the one or more other events being raised, by the local monitoring entity, in dependence on one or more other criteria of one or more other security policies of the plurality of security policies, wherein raising of the one or more other events are indicative of one or more violations of the one or more other security policies, and wherein the heightened reporting priority represents recognition, based on context provided by the event, of an increased importance of the one or more other events as compared to an importance represented by the reporting priority of respective security policies of the one or more other security policies; and report to a remote monitoring entity occurrence of events in dependence on their respective reporting priorities.

12. The non-transitory machine-readable medium as claimed in claim 11, wherein the program code causes events to be stored, by the local monitoring entity, in a buffer at the data processing system in dependence on their respective reporting priorities.

13. The non-transitory machine-readable medium as claimed in claim 12, wherein the events are stored in the buffer until there is sufficient connectivity between the data processing system and the remote monitoring entity to report, by the local monitoring entity, the occurrence of the events to the remote monitoring entity.

14. The non-transitory machine-readable medium as claimed in claim 12, wherein the events are stored in the buffer in a queue, each event being assigned a respective position in the queue in dependence on its respective reporting priority.

15. The non-transitory machine-readable medium as claimed in claim 12, wherein the buffer has a fixed capacity and wherein the program code causes a first event to replace a second event within the buffer based on the reporting priority of the first event being higher than the reporting priority of the second event.

16. The non-transitory machine-readable medium as claimed in claim 12, wherein the buffer has a variable capacity and wherein the program code causes the buffer to increase its capacity to accommodate a particular event within the buffer based on the reporting priority of the particular event being higher than the reporting priorities of one or more other events stored within the buffer.

17. The non-transitory machine-readable medium as claimed in claim 12, wherein the program code causes the one or more processors to, if the buffer has greater than a predetermined occupancy, coalesce one or more events stored within the buffer based on the reporting priorities of the one or more events being below a threshold.

18. The non-transitory machine-readable medium as claimed in claim 11, wherein the program code causes the one or more processors to direct raised events to one of multiple egress queues in dependence on their respective reporting priorities.

19. A method for implementation by one or more processors of a data processing system, the method comprising:

establishing a software entity at the data processing system configured to act as a local monitoring entity for the data processing system;

monitoring the data processing system for insider risk scenarios based on a plurality of security policies using the local monitoring entity;

raising an event, by the local monitoring entity, based on the monitoring of the data processing system in dependence on one or more criteria specified by a security policy of the plurality of security policies, wherein raising of the event is indicative of a violation of the security policy, wherein each of the plurality of security policies has a reporting priority, and wherein events raised by the local monitoring entity have a reporting priority;

assign, by the local monitoring entity, the reporting priority of the security policy to the reporting priority of the event; and in dependence on the event having been raised, assigning, by the local monitoring entity, a heightened reporting priority to one or more other events, the one or more other events being raised, by the local monitoring entity, in dependence on one or more other criteria one or more other security policies of the plurality of security policies, wherein raising of the one or more other events are indicative of one or more violations of the one or more other security policies, and wherein the heightened reporting priority represents recognition, based on context provided by the event, of an increased importance of the one or more other events as compared to an importance represented by the reporting priority of respective security policies of the one or more other security policies.

20. The method of claim 19, further comprising based on connectivity between the data processing system and a remote monitoring entity, reporting, by the local monitoring entity to the remote monitoring entity, occurrence of events in dependence on their respective reporting priorities.

* * * * *